May 17, 1932.  G. L. ROCK  1,859,111
INDEXING APPARATUS
Filed Sept. 28, 1927  2 Sheets-Sheet 1

Inventor
George L. Rock
by [signature]
Att'y.

May 17, 1932.  G. L. ROCK  1,859,111
INDEXING APPARATUS
Filed Sept. 28, 1927   2 Sheets-Sheet 2
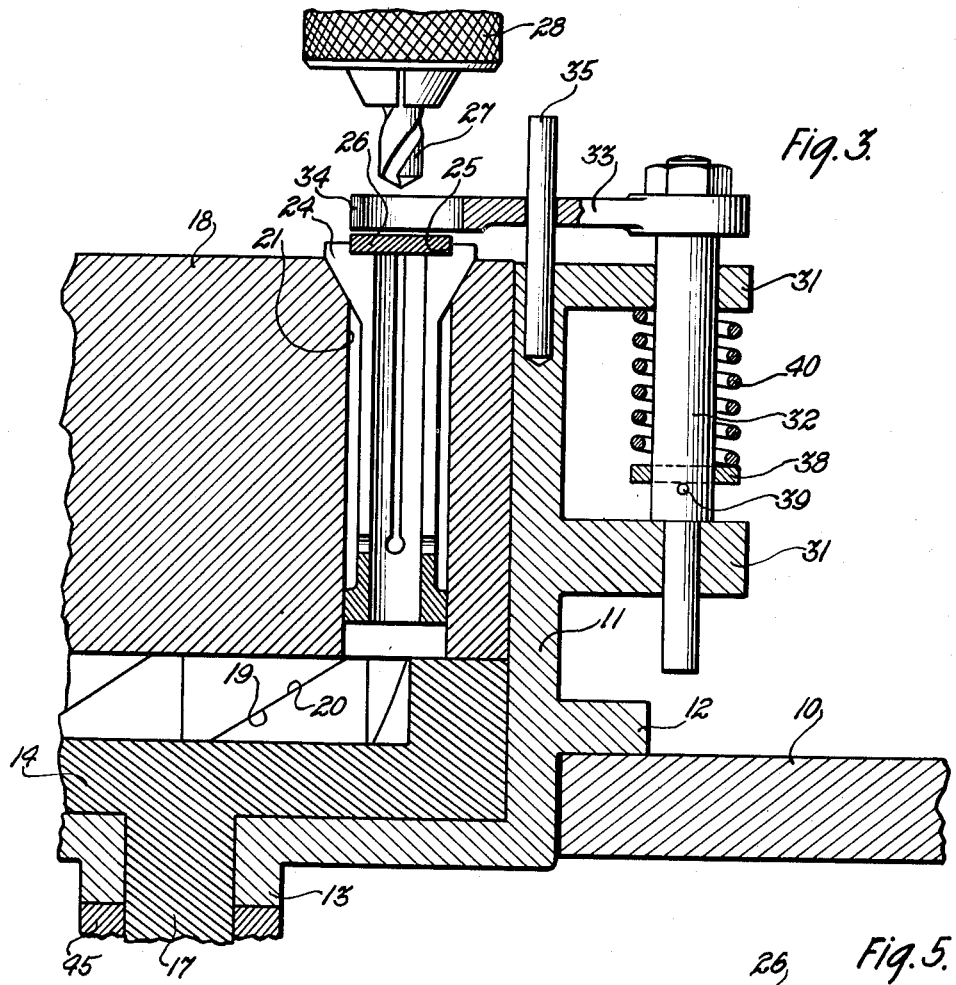
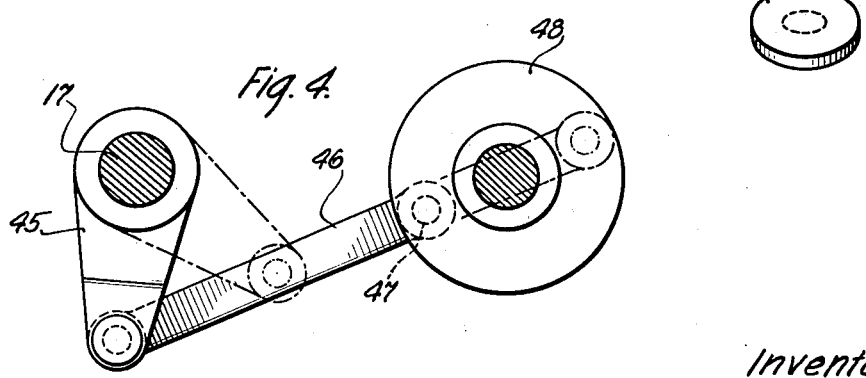
Inventor
George L. Rock
by [signature] Att'y.

Patented May 17, 1932

1,859,111

UNITED STATES PATENT OFFICE

GEORGE LYNDEN ROCK, OF CICERO, ILLINOIS, ASSIGNOR TO WESTERN ELECTRIC COMPANY, INCORPORATED, OF NEW YORK, N. Y., A CORPORATION OF NEW YORK

INDEXING APPARATUS

Application filed September 28, 1927. Serial No. 222,572.

This invention relates to indexing apparatus, and more particularly to an indexing apparatus for controlling work holders of article working apparatus.

The primary object of this invention is to provide a simple and efficient indexing apparatus for continually imparting varied movements to a work holder.

In accordance with one embodiment of this invention as applied to a semi-automatic article working apparatus there is provided a turret having a plurality of article holding spring collets, the turret having formed in its lower surface a plurality of equally spaced circularly arranged cam faces which engage a duplicate set of cam faces formed in the upper surface of a member fixed to a shaft which is given a predetermined oscillatory motion. During the movement of the shaft in one direction the turret is raised, the collet which is in operative position being automatically closed to grip the article to be worked and thereafter the article is brought into engagement with a rotating drill or other work tool, to be operated upon. After the turret has been raised a predetermined amount it is lowered, whereupon the movement of the shaft in an opposite direction indexes the turret to position another collet with an article to be worked in operative position with the work tool. Means is provided to automatically lock the turret in its indexed or article working position and during the reciprocation thereof and to release it when it is to be indexed to another position.

Other objects and advantages of this invention will more fully appear from the following detailed description taken in connection with the accompanying drawings which illustrate one embodiment of this invention, in which Fig. 1 is a plan view of an article working apparatus embodying this invention;

Fig. 3 is an enlarged vertical section taken on the line 3—3 of Fig. 1 looking in the direction of the arrows;

Fig. 4 is a plan section taken on the line 4—4 of Fig. 2, looking in the direction of the arrows, and Fig. 5 is a perspective view of an article to be worked.

Figure 1:
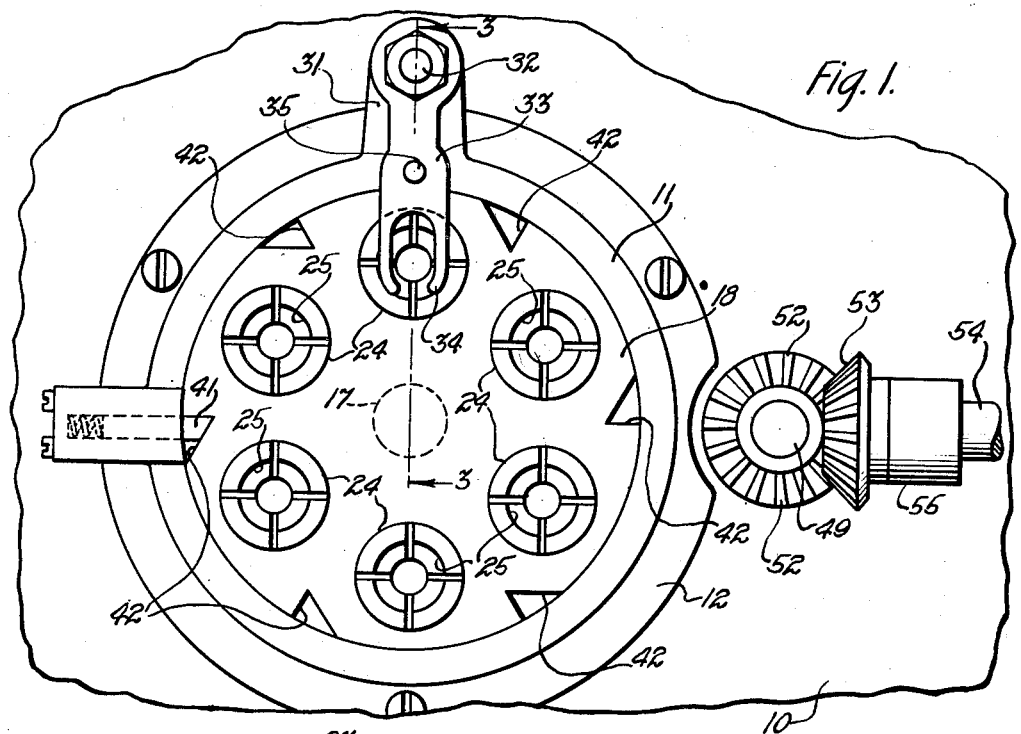

Referring now to the drawings in detail wherein like reference numerals indicate similar parts throughout the several views, a supporting framework or table 10 has secured thereto a substantially cylindrical hollow base 11 provided with an annular flange 12 which is fixed to the table 10. The lower portion of the base 11 extends through an aperture in the table 10 and is provided with an axial journal 13. Arranged for rotary movement in the base 11 is a cylindrical member 14 provided upon its lower surface with a shaft 17 which extends through the journal 13, the lower surface of the member 14 riding upon the upper inner surface of the base 11. Reciprocally carried in the base 11 for upward and downward movement and also for rotary motion is a drum or turret 18. Upon opposed circular lower and upper surfaces of the turret 18 and member 14 are formed a plurality of, in the present instance six, reversed but similar or complementary, equally spaced cam faces 19 and 20, respectively, which as clearly shown in their normal position (Fig. 2) fit one within the other in close relation. The cam faces 19 and 20 are similar to ratchet teeth comprising inclined faces terminating at either end in faces perpendicular to the plane of rotation of the turret 18.

Arranged in circular formation in the upper end surface of the turret 18 are a plurality of, in the present instance six, apertures 21 spaced on 60° centers. Within each of the apertures 21 is carried a collet or chuck 24 of a well known type, comprising a plurality of spring jaws provided with an under-cut beveled or conical surface at its upper end which engages a similar surface formed upon the upper end surface of the turret 18 and surrounding the aperture 21 therein. Formed in the upper end surface of the collet 24 is an annular depression 25 for receiving an article to be worked, for example, a disk 26 which is to have an axial opening formed therein by a rotary drill 27 fixed to a chuck 28 positioned above the collets 24.

and diametrically opposite a point where an operator is preferably stationed to load the collets with the disks 26 to be drilled, which point is the lowermost position of the collets as viewed in Fig. 1.

The means for automatically closing the collets 24 to grip the disk 26 before the disk is moved into operative engagement with the drill 27 and to open the collet after the drilling operation, whereupon the disk may be removed therefrom, either manually or by, for instance, a suitably directed air blast nozzle (not shown) comprises the following: Vertically slidable on a pair of arms 31 formed integral with the base 11 and extending from the periphery thereof is a pin 32 provided with a reduced diameter at its lower end, the shoulder formed thereby normally resting upon the upper surface of the lower arm. Fixed to the upper end surface of the pin 32 is an arm 33 which is bifurcated at its free end 34. The furcations upon the free end 34 of the arm 33 are disposed directly below and equally spaced at either side of the axis of the drill 27 and the collets 24 as they are each successively axially alined with the drill in the operation of the apparatus to be described. A pin 35 fixed to the base 11 and having a sliding fit in an aperture formed in the arm 33 serves to retain it in its operative position, as shown in Figs. 1 and 3. Surrounding the pin 32 between the underside of the upper arm 31 and a collar 38 resting on a pin 39 secured in the pin 32 is a compression spring 40, which it will be apparent serves to maintain the arm 33 in its lowered or normal position (Fig. 3) wherein the underside of the furcations thereof are spaced sufficiently from the upper surface of the disk 26 to be drilled to permit a disk to be indexed into position thereunder. In the operation of the apparatus, to be described more fully hereinafter, the turret 18 is moved upwardly and the upper surface of a disk 26 carried in the collet 24 which has been indexed into operative position under the drill 27 engages the under surfaces of the furcations of the resiliently mounted arm 33. The continued upward movement of the turret 18, which is resisted by the arm 33, results in a slight downward movement of the collet 24 into the aperture 21 of the turret, and due to the conical cooperating surfaces formed upon the turret and the collet, the spring jaws of the latter are moved inwardly, the disk 26 being gripped in the depression 25 formed at the upper end of the jaws. Upon a downward movement of the turret a reverse action takes place, the spring 40 returning the arm 33 to its normal position and the jaws of the collet 24 expanding to release the disk 26.

Figure 2:
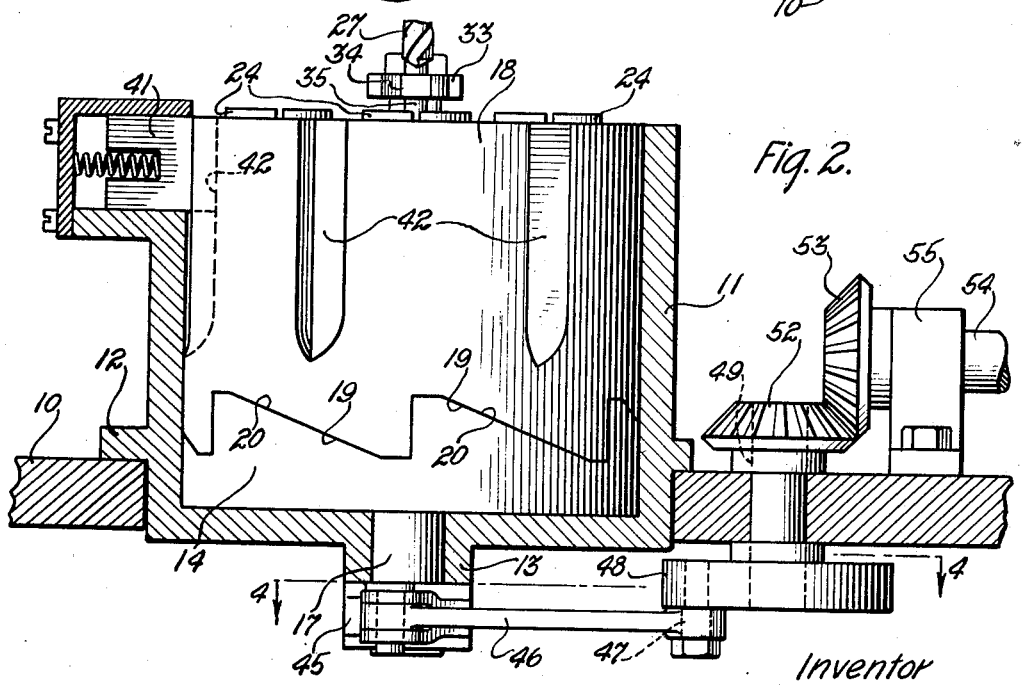
Fig. 2 is a front elevation thereof, partly in section.

To positively maintain the turret 18 in its operative position at the end of an indexing movement and during the drilling operation, a spring pressed detent 41 is provided (Figs. 1 and 2). The detent 41 is mounted in the stationary base 11 with its inner end beveled and arranged to engage V-shaped notches or teeth 42 formed in the peripheral surface of the turret 18, the teeth being equal in number to the collets 24 and similarly spaced, but are disposed intermediate the collets. The teeth 42 are formed vertically in the turret 18 and extend for such a distance as to permit a vertical reciprocatory movement of the turret in the operation of the apparatus.

The member 14 is oscillated intermittently by a lever 45 fixed at one end to the shaft 17 of the cylindrical member 14, the opposite end of the lever being pivotally connected to one end of a pitman 46. The opposite end of the pitman 46 is pivoted upon a crank pin 47 fixed to a crank disk 48, which is axially secured to a vertically disposed shaft 49, the shaft 49 being journaled in the table 10 and carrying at its upper end a bevel gear 52 meshing with a companion gear 53 fixed to a shaft 54. The end of the shaft 54 carrying the gear 53 is supported in a journal 55 and at its opposite end is connected to a suitable source of driving power (not shown), which serves in the operation of the apparatus to continuously rotate the crank disk 48. The direction of rotation of the shaft 54 and the connections between the crank disk 48 and the shaft 17 are such that during one complete revolution of the disk the member 14 is given an oscillatory motion, first a movement of 60° in a counter-clockwise direction, as viewed in Figs. 1 and 4, which movement corresponds to the spacing of the collets 24 and the cam faces 19 and 20 upon the turret 18 and the member 14, respectively, and then a similar movement in the reverse direction and so on.

In the operation of the article working apparatus embodying the turret indexing apparatus as hereinbefore described and referring particularly to Fig. 1 wherein it will be understood the crank disk 48 (Figs. 2 and 4) is continuously rotating and that the collet 24, which has just previously had a drilled disk 26 removed from the depression 25 either manually or by means (not shown) has been indexed to the loading position and a disk 26 placed in the depression 25. With the apparatus in this condition it will be understood that the upper or diametrically opposite collet 24 has just been moved under the drill 27 with an undrilled disk 26 carried thereby ungripped by the jaws of the collet and also the two left hand collets 24 intermediate the lower and upper collets also contain ungripped disks. Referring now to Fig. 2 it will be apparent that a movement of the member 14 in a counter-clockwise direction will cause the inclined cam faces 20 to move along the similarly inclined reversed cam faces 19 of the turret 18. During this movement, due to the detent 41 engaging a tooth 42 of the turret 18, the latter is maintained non-rotatable and as a consequence will move upwardly. During the upward movement of the turret the disk 26 supported in the upper collet 24 will first engage the under surfaces of the furcations of the free end 34 of the lever 33 and in the manner hereinbefore described the disk will be gripped by the jaws of the collet. The continued upward movement of the turret 18 brings the disk 26 into engagement with the rotating drill 27, the furcations of the lever 33 clearing the drill. Upon the termination of the counter-clockwise movement of the member 14 during a half revolution of the crank disk 48 the vertical faces of the reversed cam faces 19 and 20 are again alined and the drilling operation is completed. The turret 18 is thus permitted to drop by gravity to its normal position (Figs. 2 and 3). The turret 18 is cushioned in its downward movement due to its close fit within the base 10 and air which is pocketed between the member 14 and the turret. As the member 14 is oscillated in the reverse or clockwise direction during the next half revolution of the crank disk 48 the turret 18 is revolved in the same direction, due to the abutting vertical faces of cams 19 and 20, the detent 41 due to the shape thereof and the teeth 42 permitting this motion of the turret Thus another collet 24 carrying an ungripped disk 26 is indexed into operative position under the drill 27 and an empty collet into the loading position, whereupon motion is again imparted to the member 14 in a counter-clockwise direction to cause the disk to be gripped in the collet and drilled as before described, the apparatus continuing to operate in the manner described as long as the crank disk 48 and drill 27 are continuously rotated and the drilled disks are caused to be removed and replaced with disks to be drilled.

From the foregoing description it will be apparent that an efficient indexing apparatus of few and simple parts is provided for controlling rotary work holders of article working apparatus.

Although the invention has been disclosed and described as applied to a particular type of apparatus, it is clear that it may have a more general application, and that modifications can be made without departing from the spirit and scope of the appended claims.

What is claimed is:

1. In an indexing apparatus for reciprocating and rotatably indexing a drum member of an article working apparatus having a plurality of article holding spring collets arranged in one end surface of the drum member and a work tool adjacent thereto, driving means including an oscillatory element arranged coaxially with the drum member, the drum member and the element provided with abutting cooperating surfaces for imparting reciprocatory and rotary motions to the drum member during an oscillation of the element in opposite directions, means adjacent the end of the drum member containing the collets and cooperating with the articles therein when the latter are in a work performing position and during a reciprocation of the drum member to and from the work tool for causing the collets to successively grip and release the articles, and means for locking the drum member from rotation in one direction during the reciprocatory movement thereof by the element.

2. In an indexing apparatus, a member capable of being reciprocated and rotated, an oscillatory driving element for the member, means for oscillating the driving element, the member and the driving element being provided with complementary cooperating projections having vertical abutting and inclined cam surfaces for imparting reciprocatory and rotary motions, respectively, to the member during oscillatory movements of the driving element, and means operatively associated with the member for preventing backward rotation of the member and cooperating with the cam surfaces for causing reciprocation of the member.

3. In an indexing apparatus for reciprocating and rotatably indexing a work holder of an article working apparatus, driving means including an oscillatory element for the work holder, the work holder and the element being provided with similar cooperating projections having vertical abutting and inclined cam surfaces for imparting reciprocatory and rotary motions, respectively, to the work holder during an oscillation of the element in opposite directions, and means operatively associated with the work holder for preventing backward rotation of the work holder and cooperating with the cam surfaces for causing reciprocation of the work holder.

4. In an indexing apparatus for reciprocating and rotatably indexing a work holder of an article working apparatus, driving means including an oscillatory element arranged coaxially with the work holder, the work holder and the element being provided with a plurality of equally spaced circularly arranged abutting complementary cooperating projections having vertical abutting and inclined cam surfaces upon opposite ends for imparting alternate reciprocatory and rotary motions, respectively, to the work holder during an oscillation of the element in opposite directions, and means operatively associated with the work holder for preventing backward rotation of the work holder and cooperating with the cam surfaces for causing reciprocation of the work holder.

5. In an indexing apparatus for reciprocating and rotatably indexing a work holder of an article working apparatus, driving means including an oscillatory element arranged coaxially with the work holder, the work holder and the element being provided with a plurality of continuously engaging similar cooperating projections having vertical abutting and inclined cam surfaces for imparting reciprocatory and rotary motions, respectively, to the work holder during an oscillation of the element in opposite directions, and means operatively associated with the work holder for preventing backward rotation of the work holder and cooperating with the cam surfaces for causing reciprocation of the work holder.

6. In an indexing apparatus, a reciprocable and rotatable member, an oscillatory driving element for the member, the member and the element being provided with similar cooperating projections having vertical abutting and inclined cam surfaces for imparting reciprocatory and rotary motions, respectively, to the member during movements of the element, means for imparting an oscillatory movement to the driving element, and a detent member operatively engaged continually with surfaces of the member for preventing backward rotation of the member and cooperating with the cam surfaces for causing reciprocation of the member.

7. In an indexing apparatus, a reciprocable and rotatable member having a cam surface comprising a plurality of projections having vertical and inclined faces, an oscillatory driving element held against axial movement and having a cam surface of complementary contour in engagement therewith, means for actuating the driving element in a predetermined direction to rotate the member and then to move the driving element in a reverse direction to reciprocate the member through the engagement of the cam surfaces, and means operatively associated with the member for preventing backward rotation of the member and cooperating with the cam surfaces for causing reciprocation of the member.

In witness whereof, I hereunto subscribe my name this 17th day of September, A. D. 1927.

GEORGE LYNDEN ROCK.